United States Patent
Boulanger et al.

(10) Patent No.: US 9,102,562 B2
(45) Date of Patent: Aug. 11, 2015

(54) GLASS ARTICLE WITH ANTIMICROBIAL PROPERTIES

(75) Inventors: Pierre Boulanger, Couthuin (BE); Fabian Mariage, Beclers (BE)

(73) Assignee: AGC Glass Europe, Brussels (BE)

( * ) Notice: Subject to any disclaimer, the term of this patent is extended or adjusted under 35 U.S.C. 154(b) by 208 days.

(21) Appl. No.: 13/810,305

(22) PCT Filed: Jul. 27, 2011

(86) PCT No.: PCT/EP2011/062870
§ 371 (c)(1),
(2), (4) Date: Jan. 15, 2013

(87) PCT Pub. No.: WO2012/013696
PCT Pub. Date: Feb. 2, 2012

(65) Prior Publication Data
US 2013/0130023 A1    May 23, 2013

(30) Foreign Application Priority Data

Jul. 27, 2010    (EP) .................................... 10170846

(51) Int. Cl.
| B32B 17/06 | (2006.01) |
| B32B 15/04 | (2006.01) |
| C03C 4/00 | (2006.01) |
| C03C 14/00 | (2006.01) |

(52) U.S. Cl.
CPC ................. *C03C 4/00* (2013.01); *C03C 14/004* (2013.01); *C03C 2204/02* (2013.01); *C03C 2214/04* (2013.01); *C03C 2214/08* (2013.01); *Y10T 428/265* (2015.01)

(58) Field of Classification Search
USPC ......... 428/410, 428, 432, 434, 688, 689, 699, 428/701, 702, 426, 433
See application file for complete search history.

(56) References Cited

U.S. PATENT DOCUMENTS

| 5,968,637 | A | 10/1999 | Baret | |
| 8,753,744 | B2 * | 6/2014 | Borrelli et al. | ................ 428/410 |
| 2003/0097858 | A1 * | 5/2003 | Strohhofer et al. | ............. 65/390 |
| 2004/0058167 | A1 * | 3/2004 | Arbab et al. | .................. 428/426 |
| 2004/0166173 | A1 * | 8/2004 | Albach | ......................... 424/618 |

(Continued)

FOREIGN PATENT DOCUMENTS

| EP | 0 806 401 | 11/1997 |
| EP | 1 985 592 | 10/2008 |
| WO | 2006 064059 | 6/2006 |

OTHER PUBLICATIONS

U.S. Appl. No. 13/810,971, filed Jan. 18, 2013, Boulanger, et al.

(Continued)

*Primary Examiner* — David Sample
*Assistant Examiner* — Lauren Colgan
(74) *Attorney, Agent, or Firm* — Oblon, McClelland, Maier & Neustadt, L.L.P.

(57) ABSTRACT

The invention relates to a glass item, at least one of the surfaces thereof having antimicrobial properties that are resistant to a temperature treatment, especially a temperature treatment in preparation of the subsequent tempering thereof. The glass item especially comprises an antimicrobial agent beneath the surface of the glass, and an inorganic component in the mass of the glass close to said surface, the concentration of the inorganic component being distributed according to a diffusion profile.

18 Claims, 4 Drawing Sheets

(56) References Cited

U.S. PATENT DOCUMENTS

| | | | |
|---|---|---|---|
| 2004/0223238 A1* | 11/2004 | Laroche et al. | 359/838 |
| 2005/0119105 A1* | 6/2005 | Zimmer et al. | 501/32 |
| 2007/0172661 A1* | 7/2007 | Fechner et al. | 428/409 |
| 2008/0153068 A1* | 6/2008 | Kessler et al. | 433/217.1 |
| 2009/0324990 A1* | 12/2009 | Pilloy et al. | 428/615 |
| 2010/0028607 A1* | 2/2010 | Lee et al. | 428/156 |
| 2010/0137121 A1* | 6/2010 | Mariage et al. | 501/32 |
| 2011/0081542 A1* | 4/2011 | Pilloy et al. | 428/341 |
| 2011/0183831 A1* | 7/2011 | Mariage et al. | 501/32 |
| 2012/0219792 A1* | 8/2012 | Yamamoto et al. | 428/336 |

OTHER PUBLICATIONS

International Search Report Issued Oct. 31, 2011 in PCT/EP11/62870 Filed Jul. 27, 2011.

\* cited by examiner

GLASS ARTICLE WITH ANTIMICROBIAL PROPERTIES

1. FIELD OF THE INVENTION

The present invention relates to a glass article, one of the surfaces of which has antimicrobial properties that are resistant to a temperature treatment, in particular a temperature treatment in preparation for their subsequent toughening.

2. SOLUTIONS OF THE PRIOR ART

There are different types of glass substrates that have a surface with antimicrobial properties and they all have at least one so-called "antimicrobial" agent. This is often located at the surface of said article. Examples of known antimicrobial agent are silver (Ag), copper (Cu) or zinc (Zn).

A glass substrate with antimicrobial properties known in particular from application WO 2005/042437 A1 is obtained by diffusing the antimicrobial agent, in particular silver (Ag), from one of the surfaces of the substrate to the bulk of the substrate over a depth in the order of 2 microns.

Another known type of glass substrate with antimicrobial properties comprises a coating on one of its surfaces that is formed by a binder and the antimicrobial agent dispersed in said binder. Such examples of substrates are given in the applications WO 03/056924 A1 and WO 2006/064060 A1.

Unfortunately, whatever the type of substrate envisaged, the antimicrobial properties are only very poorly resistant to a treatment at temperatures higher than 400° C. In fact, as a result of the rapid diffusion of the element Ag at these temperatures, this migrates progressively from the surface or from a zone close to the surface, where it is effective to neutralise microbes, towards the bulk of the glass substrate where it is no longer available to play its antimicrobial role. Such temperatures, which are typically those required to conduct the toughening of the glass (~650-700° C.), thus cause a drastic decrease in antimicrobial properties of the glass that would be thermally treated.

Now, more and more glazing applications require toughened glass sheets for safety reasons, since such a glass has increased shock resistance.

One solution to the problem arising from a thermal treatment of a glass substrate with antimicrobial properties is already known. It concerns using a so-called "diffusion barrier" layer in order to reduce or slow down the diffusion of the silver in the bulk of the glass and thus preserve the initial antimicrobial activity to the maximum. The prior art describes the use of such a layer that is then deposited directly onto the surface of the glass, and it is imperative that this is between the glass and the antimicrobial agent. The substrate must then have a second layer containing the antimicrobial agent, either alone or in combination with a binder, deposited onto the barrier layer. Such a solution to the problem is described in particular in the international application WO 2006/064060 A1.

However, this technical solution has certain limitations. In fact, the addition of one or more layers to a glass substrate often causes deterioration of the optical and/or aesthetic properties of the substrate such as, for example, a decrease in the light transmission, a change in colour or an increase in light reflection.

Moreover, this technical solution requires the consecutive deposition of at least two layers on the glass substrate, which necessarily results in additional steps in the production process, higher cost, etc.

Another technical solution to the problem of diffusion of the silver from the surface towards the bulk would be to use a larger concentration of silver from the beginning so that the adverse effect of this diffusion on the antimicrobial activity remains insignificant or low. Nevertheless, at first glance this solution is not very convincing for obvious economic reasons, but also for aesthetic reasons, since too high a concentration of silver is known to cause an unsightly yellow coloration of the glass.

3. OBJECTIVES OF THE INVENTION

The objective of the invention in particular is to overcome these disadvantages by resolving the technical problem, i.e. the reduction or slowing down of the diffusion of silver in the glass because of a thermal treatment of a glass substrate antimicrobial properties.

More precisely, an objective of the invention in at least one of its embodiments is to provide a glass substrate with antimicrobial properties, wherein the antimicrobial properties remain stable at temperatures higher than 400° C. In particular, an objective of the invention is to provide a glass substrate with antimicrobial properties, wherein the antimicrobial properties remain stable in a temperature treatment in preparation for their subsequent toughening.

Another objective of the invention is to provide a glass substrate with antimicrobial properties that does not comprise a layer and/or does not require a step of depositing layers.

Finally, a last objective of the invention is to provide a solution to the disadvantages of the prior art that is simple, quick and economical.

4. OUTLINE OF THE INVENTION

In accordance with a particular embodiment the invention relates to a glass article comprising
  (i) at least one antimicrobial agent diffused under the surface of the glass; and
  (ii) at least one inorganic compound present in the bulk of the glass close to said surface, wherein the concentration of the inorganic compound is distributed according to a profile that decreases continuously from said surface to the bulk of the glass and tends towards zero or towards a constant value identical to the concentration possibly present in the core of the glass.

Hence, the invention is based on a completely novel and inventive approach, since it allows the disadvantages of the glass products of the prior art to be overcome and the set technical problem to be resolved. The inventors have in fact shown that it was possible to obtain a glass substrate that has antimicrobial properties that are temperature-resistant without resorting to layers, by combining an antimicrobial agent diffused under the surface of the glass with an inorganic compound present in the bulk of the glass close to a surface of the article, wherein the concentration of the inorganic compound is distributed in the bulk of the glass from the surface according to a diffusion profile. Surprisingly, the inventors have thus shown that the presence of an inorganic compound in the bulk of the glass close to the surface and distributed according to a diffusion profile would enable the progressive diffusion of the silver under the effect of the temperature of the surface towards the bulk of the glass to be blocked or slowed down.

5. LIST OF FIGURES

Other characteristics and advantages of the invention will become clearer upon reading the following description of a preferred embodiment given as non-restrictive and illustrative simple example and the attached figures, wherein.

6. DESCRIPTION OF AN EMBODIMENT OF THE INVENTION

Figure 1:
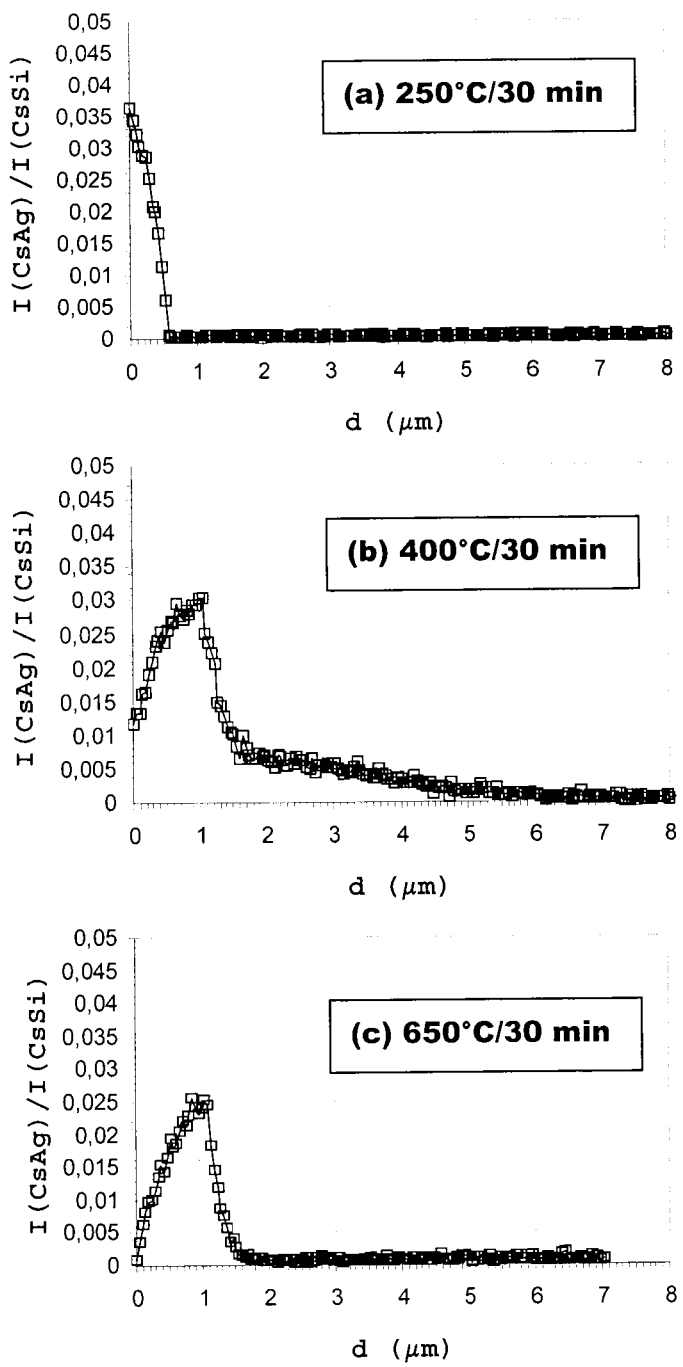
FIG. 1 shows, for comparison purposes, a profile of the silver concentration in the depth of the glass of articles with antimicrobial properties according to the state of the art.

The glass article according to the invention is formed from an inorganic glass that can belong to various categories. Thus, the inorganic glass can be a soda-lime type of glass, a boron glass, a lead glass, a glass containing one or more additives distributed homogeneously in its bulk such as, for example, at least one inorganic colouring agent, an oxidising compound, a viscosity-regulating agent and/or a fusion-promoting agent. The glass article according to the invention is preferably a soda-lime glass, which can be clear or solidly coloured. The expression "soda-lime glass" is used in its broad sense here and relates to any glass that contains the following base components (expressed in percentages of the total weight of glass):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20% |

It also relates to any glass containing the above base components that can additionally contain one or more additives.

According to an embodiment of the article according to the invention the glass of the article according to the invention is formed from a sheet of flat glass. According to this embodiment the flat glass can be, for example, a float glass, a drawn glass or a patterned glass.

Still according to this embodiment, the flat glass sheet can be subjected to the treatment according to the invention on a single face or alternatively on both its faces. In the case of a treatment on a single face of a patterned glass sheet, the treatment according to the invention is advantageously conducted on the face of the sheet that is not patterned, if this is patterned on a single face.

The glass of the article according to the invention is preferably formed from a soda-lime flat glass sheet.

It is generally preferred that the glass article has not been subjected to a coating with any layer before the treatment of the present invention, at least on the surface to be treated. The glass article according to the invention can be subjected to a coating with any layer after the treatment of the present invention, preferably on the surface opposite that which has been treated according to the invention.

The glass article according to the invention has antimicrobial properties. This is understood to mean a glass article that enables microorganisms that come into contact with it to be neutralised. "Microorganisms" are understood to be microscopic unicellular living beings such as bacteria, yeasts, micro-algae, fungi or viruses. "Neutralise" is understood to mean at minimum maintaining the initial quantity of the microorganisms (static effect), and the invention excludes an increase in this quantity. The development and proliferation of microorganisms are thus prevented and in almost all cases the coating surface of the microorganisms decreases even if the quantity thereof is maintained. According to the invention the neutralisation of microorganisms can extend to their partial and even total destruction (microbicidal effect).

In particular, the glass article according to the invention has an antibacterial (bactericidal or bacteriostatic) effect on a large number of bacteria, whether these are gram positive or gram negative bacteria, in particular on one at least of the following bacteria: *Escherichia coli, Staphylococcus aureus, Pseudomonas aeruginosa, Enterococcus hirae*. Advantageously, the glass article according to the invention also has an antifungal (fungicidal or fungiostatic) effect, in particular on *Candida albicans* and/or *Aspergillus niger*.

The glass article according to the invention comprises at least one antimicrobial agent diffused under the surface of the glass. According to the invention the antimicrobial agent is chosen from the elements: silver (Ag), copper (Cu), tin (Sn) and zinc (Zn).

According to the invention the antimicrobial agent is present either in the form of very small particles of metal or oxide or dissolved in the matrix of the glass.

The antimicrobial agent according to the invention is preferably the element silver (Ag). In this case, the silver is advantageously diffused under the surface so that the ratio of intensities I(CsAg/I(CsSi) on the surface (measured using the dynamic SIMS method) is higher than 0.002 and preferably higher than or equal to 0.010. Such ratio values I(CsAg/I(CsSi) enable an adequate antimicrobial effect to be obtained.

The measurement of the ratio of intensities I(CsAg)/I(CsSi) was conducted on a Cameca ims-4f machine. I(CsAg) is the peak intensity obtained for the ions CsAg+ and I(CsSi) is the peak intensity obtained for the ions CsSi+ after the surface of the substrate has been bombarded by a beam of Cs+ ions, which progressively etch the surface of the sample. The energy of the beam of Cs+ ions reaching the substrate is 5.5 keV. The angle of incidence of the beam is 42° in relation to the normal to the substrate. The surface values signify that the values are taken for the lowest possible depth as soon as the obtained value is significant. Depending on the rate of erosion used, the first significant values can correspond to maximum depths of about 1 to 5 nm. In the present case the surface values correspond to a depth of 2 nm at maximum. To ensure that the values obtained are significant, the ratio of intensities of the isotopes I(Ag107)/I(Ag109) must especially be close to the theoretical value (1.0722), in particular in the range between 1.01 and 1.13.

According to a particular embodiment of the invention the concentration of antimicrobial agent is distributed in the depth of the glass according to a classic diffusion profile, i.e.

a profile that decreases continuously from the surface of the glass and tends towards zero at a given depth.

According to another particular embodiment of the invention the concentration of antimicrobial agent is distributed in the depth of the glass according to a profile that has a minimum. The minimum is preferably located at a distance from the surface of between 10 and 4000 nm.

The glass article according to the invention comprises at least one inorganic compound present in the bulk of the glass close to a surface of the article. Any inorganic compound that reduces or slows down the diffusion of the antimicrobial agent under the effect of temperature can be suitable.

According to the invention the inorganic compound can be completely foreign to the composition of the bulk of the glass of the article. In a variant, it can also be already present in the composition of the bulk of the glass of the article.

It is generally also preferred that in the glass article the inorganic compound is present in the form of a metal, oxide, nitride or carbide.

Preferably, the inorganic compound is selected from magnesium, calcium, strontium, barium, scandium, yttrium, lanthanum, titanium, zirconium, vanadium, niobium, tantalum, aluminium, gallium, indium, silicon and germanium.

Advantageously, the inventors have shown that the resistance to temperature of the antimicrobial properties is particularly good when the inorganic compound is aluminium.

According to a particular embodiment of the invention the concentration of inorganic compound is distributed in the depth of the glass according to a profile that decreases continuously from the surface of the glass and tends towards zero or towards a constant value that is identical to the concentration possibly present in the core of the article from a depth in the range of a distance that is not less than 10 nm, preferably that is not less than 50 nm from the surface. Moreover, said depth is at a distance from the surface that is not greater than 2500 nm, preferably not greater than 1000 nm and more preferred not greater than 500 nm.

According to the invention and in general, the inorganic compound is dissolved in the bulk of the glass. However, according to a particular embodiment of the invention the inorganic compound can be present in the bulk of the glass, completely or partially, in the form of very small particles, in particular in the form of microparticles or nanoparticles.

The glass article according to the invention can be thermally treated, in particular it can be thermally treated in preparation for a toughening operation. The invention covers the glass article that has not been thermally treated as well as the thermally treated glass article. According to a particular embodiment of the invention, the glass article has antimicrobial properties as well as properties of toughened glass. Glass with properties of toughened glass is understood to be a glass that has increased mechanical strength in relation to a classic non-toughened glass of the same thickness and the same composition.

The glass article according to the invention can be obtained using a process comprising two main steps:
 (a) the deposition and diffusion of the inorganic compound in the bulk of the glass close to its surface; and
 (b) the deposition and diffusion of the antimicrobial agent under the surface of the glass.

Different methods known per se are suitable for diffusing the inorganic compound into the bulk of the glass close to its surface. In particular, an example of a process comprises (a) the deposition of the inorganic compound onto the surface of the glass, for example, in layer form, (b) the supply of energy in such a manner that the inorganic compound diffuses into the glass.

The deposition of the inorganic compound onto the surface of the glass can be conducted by known methods such as
 chemical vapour deposition (or CVD): a modified chemical vapour deposition process (or MCVD) can be used in the present invention. This modified method differs from the classic method in that the precursor reacts in the gaseous phase rather than on the surface of the glass;
 wet deposition such as sol-gel deposition, for example, or flame spraying starting with a liquid, gaseous or solid precursor that is subjected to atomisation in an aerosol transported into a flame where a combustion occurs.

The energy necessary for the diffusion of the inorganic compound into the bulk of the glass can be supplied, for example, by heating the glass or its surface to an appropriate temperature. The energy necessary for the diffusion can be supplied at the time of deposition of the inorganic compound or subsequently. Flame spraying is particularly advantageous in this case since the energy necessary for the diffusion is supplied at the time of deposition by the heat of the flame itself. Advantageously, the diffusion of the inorganic compound according to the invention is achieved using such a process.

Different methods known per se are suitable for obtaining an antimicrobial agent below the surface of a glass article. In particular, it is possible to deposit the antimicrobial agent in the form of a layer by pyrolytic spray or by cathodic sputtering followed by a slight controlled diffusion of the antimicrobial agent under the surface, for example, for 30 minutes at a temperature of 250° C. The steps of depositing the antimicrobial agent and diffusing this under the surface can also be virtually simultaneous if the glass article or its surface is firstly heated.

Advantageously, the glass article according to the invention can be obtained in a single main step using a flame spraying technique starting from a solution of a salt of the inorganic compound or of a salt of the antimicrobial agent.

Because of its antimicrobial properties and because it can be thermally toughened without changing said properties, the glass article according to the invention has numerous applications. As an example, it can be used as recipient for foodstuffs or as an element for a bathroom, kitchen or laboratory (mirror, partition, floor, work surface, door). It can also be used as an element in appliances such as refrigerator shelves or oven doors. It also has numerous applications in hospitals.

The following examples illustrate the invention without intending to limit its coverage in any way.

Example 1

Comparative

Three sheets of clear soda-lime float glass with a thickness of 4 mm and measuring 20 cm×20 cm were washed consecutively in flowing water, deionised water and isopropyl alcohol and then dried. They were then each coated with a thin layer of silver using the method of vacuum deposition also referred to as cathodic magnetron sputtering in a manner known per se using a metallic silver target in an argon atmosphere. The quantity of silver deposited is 40 mg/m$^2$ of surface area treated. To cause the silver to diffuse under the surface, the three glass sheets were then subjected to a thermal treatment in the following conditions (duration and temperature):
 sheet 1: 250° C. for 30 minutes;
 sheet 2: 400° C. for 30 minutes;
 sheet 3: 650° C. for 30 minutes.

The treated sheets were then cleaned in acid (solution of $HNO_3$ and $Fe(NO_3)_3$) to eliminate the excess silver remaining on the surface that has therefore not diffused during the thermal treatment.

The glass sheets treated as described above were analysed by secondary ion mass spectrometry.

FIG. 1 shows the quantity of silver (ratio of intensities I(CsAg)/I(CsSi)) diffused under the surface of the glass as a function of the depth (d) in the substrate for each of the thermal treatments (a), (b) and (c). Moreover, the quantity of silver at the surface (d=o) was estimated on the basis of the ratio of intensities I(CsAg)/I(CsSi) obtained by dynamic SIMS. I(CsAg) is the peak intensity obtained for the ions $CsAg^+$ and I(CsSi) is the peak intensity obtained for the ions $CsSi^+$ after the surface of the substrate has been bombarded by a beam of $Cs^+$ ions with a "Cameca ims-4f" machine (beam 5.5 keV and angle of incidence 42° in relation to the normal to the substrate). These analyses illustrate the drastic effect of the temperature on the quantity of silver present on the surface of the glass with the same duration of treatment. The determined intensity ratios I(CsAg)/I(CsSi) at the surface (d=o) are in fact as follows:

sheet 1: 0.037
sheet 2: 0.011
sheet 3: 0

A treatment at a temperature of 400° C. or 650° C. causes a very significant migration of the silver from the surface towards the bulk of the glass with a maximum centred around 1 micron. The silver located at this distance from the surface is no longer available to play its antimicrobial role and is therefore lost. The effect of the treatment at 650° C. is so negative that the quantity of silver present at the surface of the glass is practically zero.

Example 2

Comparative

A sheet of clear soda-lime float glass with a thickness of 4 mm and measuring 20 cm×20 cm was washed consecutively in flowing water, deionised water and isopropyl alcohol and then dried.

Hydrogen and oxygen were fed into a spot burner in order to generate a flame at the outlet of said burner. A solution containing silver nitrate $AgNO_3$ dissolved in water (aluminium/water dilution ratio by weight=1/1442, solution flux=4.7 ml/min) was fed into the flame. The washed glass sheet was firstly heated in a furnace to a temperature of 600° C. and one of its surfaces was placed under the burner close to the end of the flame at a distance of 130 mm. In order to cover the entire surface of the glass sheet, the spot burner is movable in both spatial directions within the plane of said sheet. The head of the burner was displaced continuously in one of the two directions at a fixed speed of 3 meters per minute and in the other direction perpendicular to the first was displaced with jumps of 2 centimeters. After this treatment the glass sheet was then cooled in a controlled manner.

The glass sheet treated as described above was analysed by secondary ion mass spectrometry.

Figure 2:
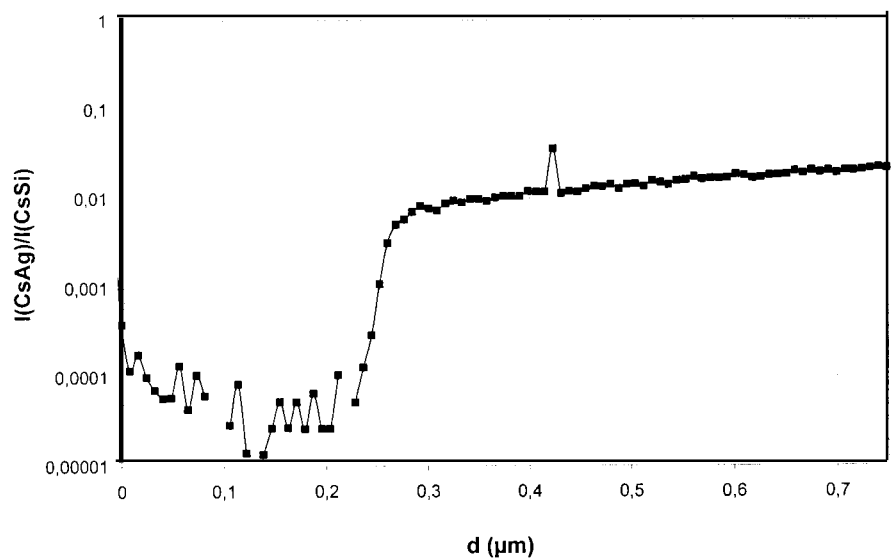
FIG. 2 shows, for comparison purposes, a profile of the silver concentration in the depth of the glass of an article without inorganic compound and obtained by flame spraying.

FIG. 2 shows the quantity of silver (ratio of intensities I(CsAg)/I(CsSi) on a logarithmic scale) diffused as a function of the depth (d) in the glass sheet starting from the treated surface. It illustrates the diffusion of the silver under the surface of the glass. The concentration of silver is distributed over a depth greater than 1 micron according to a profile that has a minimum at a depth from the surface of about 150 nm. Moreover, the ratio of intensities I(CsAg)/I(CsSi) at the surface is 0.0004.

Example 3

According to the Invention

A sheet of clear soda-lime float glass with a thickness of 4 mm and measuring 20 cm×20 cm was washed consecutively in flowing water, deionised water and isopropyl alcohol and then dried.

Hydrogen and oxygen were fed into a linear burner in order to generate a flame at the outlet of said burner. The burner used had a width of 20 cm and had 2 nozzles for supply of the precursor solution. The washed glass sheet was firstly heated in a furnace to a temperature of 600° C. and at this temperature was then passed under the burner located at a distance of 90 mm above the glass sheet at a speed of about 8 m/min. The solution fed into the flame by means of the nozzles contained silver nitrate $AgNO_3$ dissolved in water (silver/water dilution ratio by weight=1/3500) and non-ahydrate aluminium nitrate $Al(NO_3)_3.9H_2O$ dissolved in methanol (aluminium/methanol dilution ratio by weight=1/20). The total flux of the solution was 360 ml/min. After this treatment the glass sheet was then cooled in a controlled manner.

The glass sheet treated as described above was analysed by secondary ion mass spectrometry.

Figure 3:
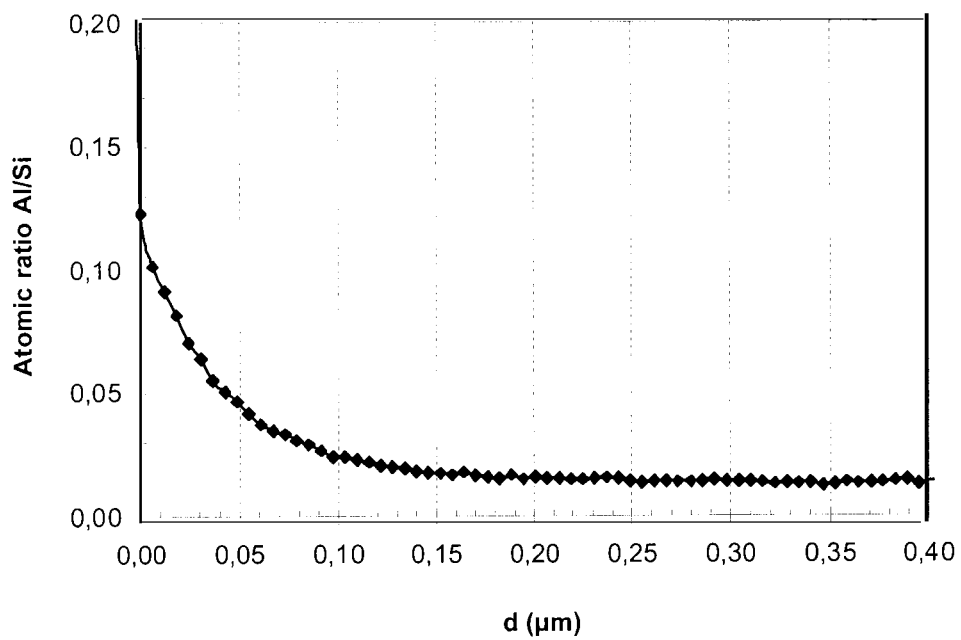
FIG. 3 shows a diffusion profile of the aluminium under the surface of the glass of an article according to the invention obtained by flame spraying (linear burner)

FIG. 3 shows the atomic ratio of Al/Si as a function of the depth (d) in the glass sheet starting from the treated surface. It shows that the concentration of aluminium is distributed according to a diffusion profile. This decreases continuously from the surface of the glass towards the bulk of said glass and tends towards a constant value (that of the core of the glass sheet) from a depth of about 200 nm.

Figure 4:
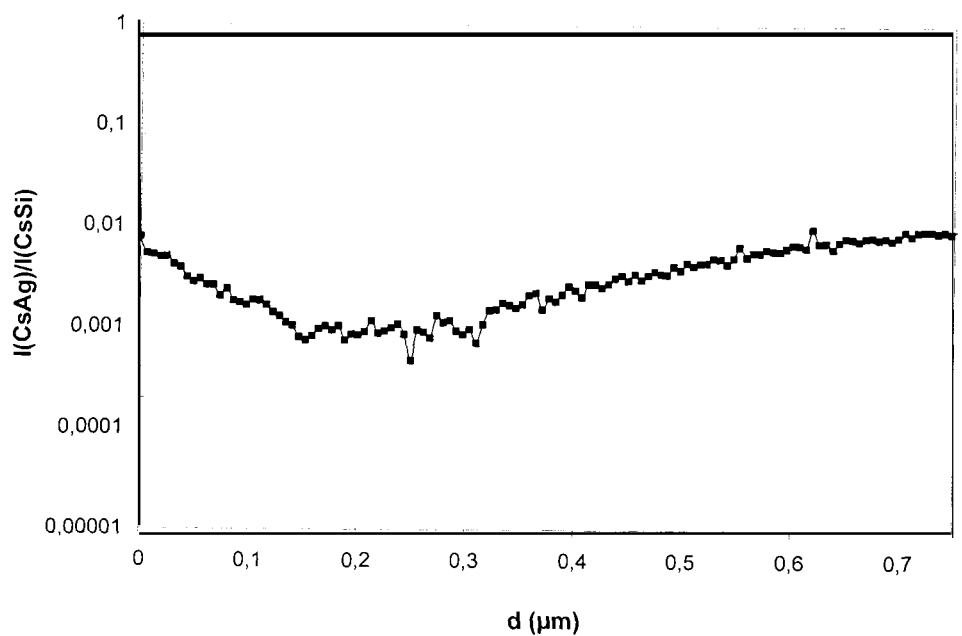
FIG. 4 shows a profile of the silver concentration in the depth of the glass of an article according to the invention obtained by flame spraying.

FIG. 4 shows the quantity of silver diffused (ratio of intensities I(CsAg)/I(CsSi) on a logarithmic scale) as a function of the depth (d) in the glass sheet starting from the treated surface. It illustrates the diffusion of the silver below the surface of the glass. The silver concentration is distributed in the depth of the glass according to a profile that has a maximum value at the surface, shows a progressive decrease to a minimum centred around 200 nm, followed by a slight increase ending by levelling out from about 0.8 micron. Moreover, the ratio of intensities I(CsAg)/I(CsSi) at the surface (maximum value of the profile) is 0.008, which shows that, starting from the same process for causing the silver to diffuse, the presence of nanoparticles enables a much higher silver concentration to be obtained at the surface of the glass, which benefits the antimicrobial activity.

Example 4

According to the Invention

An article according to the invention was obtained in an installation intended for the continuous production of soda-lime flat glass. This installation comprises a melting furnace, a tin bath and a cooling station. The glass in molten state was poured in ribbon form from the melting furnace onto the tin bath. The glass ribbon had an average thickness of 8 mm. It was then passed to a 20 cm wide linear burner at a constant speed of about 7.75 m/min at a temperature of 615° C. The burner was supplied with hydrogen and oxygen in order to generate a flame at the outlet of said burner and it was placed above the glass sheet at a distance of 145 mm. A solution containing silver nitrate $AgNO_3$ dissolved in methanol (silver/methanol dilution ratio by weight=1/3500) and non-ahydrate aluminium nitrate $Al(NO_3)_3.9H_2O$ dissolved in methanol (aluminium/methanol dilution ratio by weight=1/20) was fed into the flame (total solution flux=343 ml/min). The glass sheet was subsequently passed to the cooling station where it was cooled in a controlled manner in conditions usually used for flat float glass.

The glass sheet treated as described above was analysed by secondary ion mass spectrometry.

Figure 5:
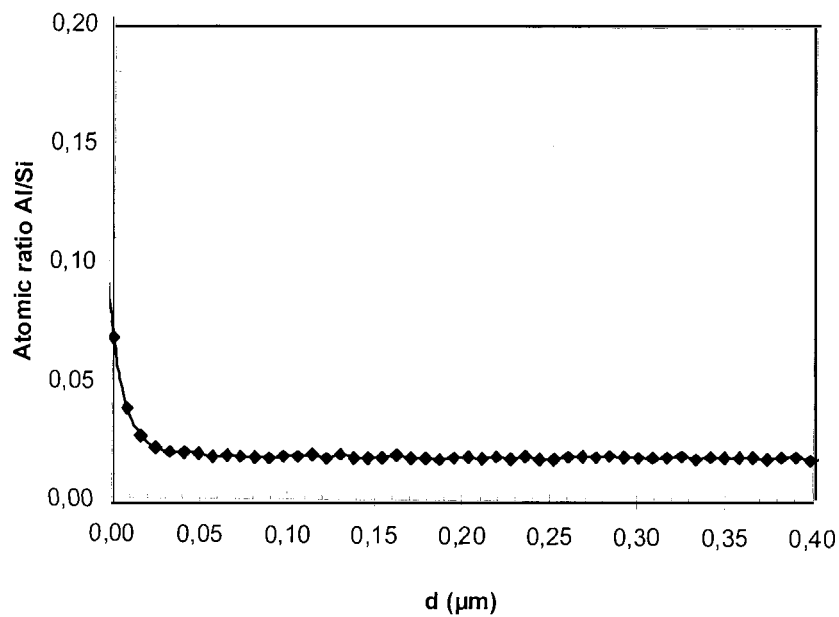
FIG. 5 shows a diffusion profile of the aluminium under the surface of the glass of an article according to the invention obtained by flame spraying.

FIG. 5 shows the atomic ratio of Al/Si as a function of the depth (d) in the glass sheet starting from the treated surface. It shows that the concentration of aluminium is distributed according to a diffusion profile. This decreases continuously from the surface of the glass towards the bulk of said glass and tends towards a constant value (that of the core of the glass sheet) from a depth of about 50 nm.

Figure 6:
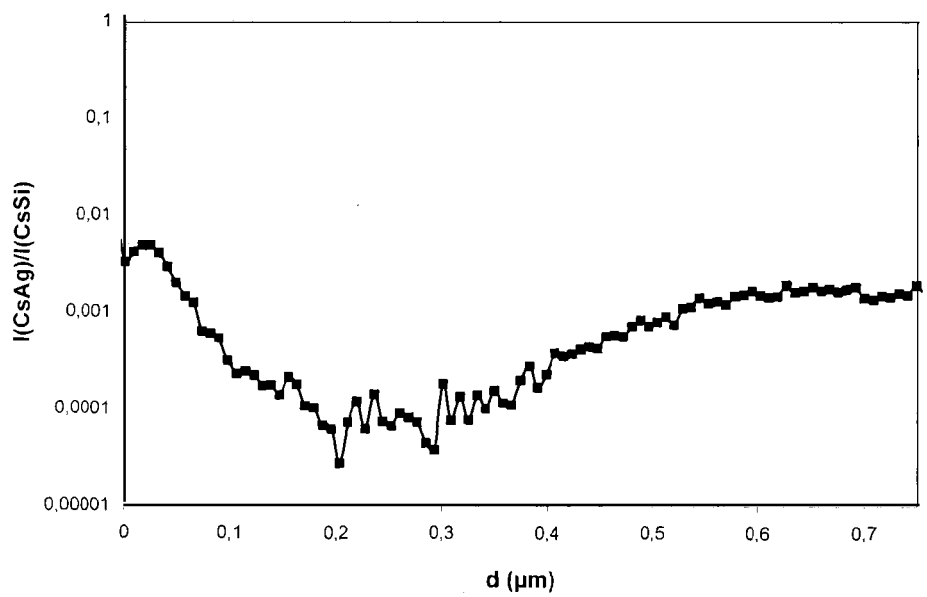
FIG. 6 shows a profile of the silver concentration in the depth of the glass of an article according to the invention obtained by flame spraying.

FIG. 6 shows the quantity of silver diffused (ratio of intensities I(CsAg)/I(CsSi) on a logarithmic scale) as a function of the depth (d) in the glass sheet starting from the treated surface. It illustrates the diffusion of the silver below the surface of the glass. The silver concentration is distributed in the depth of the glass according to a profile that has a maximum value at the surface, shows a progressive decrease to a minimum centred around 250 nm, followed by a slight increase ending by levelling out from about 0.6 micron. The ratio of intensities I(CsAg)/I(CsSi) at the surface (maximum value of the profile) for Example 4 is 0.003, which shows once again that the presence of aluminium enables a much higher silver concentration to be obtained at the surface of the glass.

Example 5

According to the Invention

The glass sheet of Example 4 was toughened in a manner known per se, i.e. it was heated to a temperature of 670° C. for 3 minutes and then subjected to a very rapid cooling to ambient temperature.

The toughened glass sheet was analysed using the same techniques as those cited in Example 4.

Figure 7:
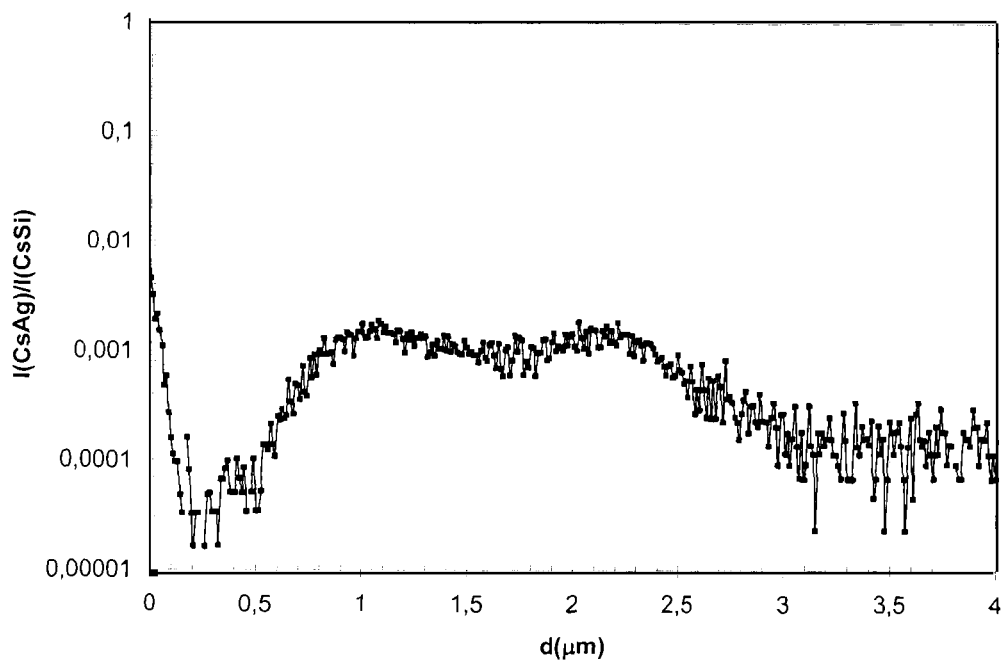
FIG. 7 shows a profile of the silver concentration in the depth of the glass of an article according to the invention that has been obtained by flame spraying and toughened.

FIG. 7 shows the ratio of intensities I(CsAg)/I(CsSi) (logarithmic scale) as a function of the depth (d) in the glass sheet starting from the treated surface. It shows that even if a portion of the silver located in the bulk of the glass close to the surface before toughening migrated into the depth of the glass beforehand as a result of the toughening, the quantity of silver at the surface (d=o) is maintained. The ratio I(CsAg)/I(CsSi) at the surface (maximum value of the profile) is 0.0045. These results therefore show that the presence of aluminium allows the concentration of silver to be maintained at the surface even after toughening (compared to the sample of Example 1 without aluminium, where the concentration of silver at the surface after a similar thermal treatment is zero).

The invention claimed is:
1. A glass article having antimicrobial properties comprising:
   an antimicrobial agent diffused under a surface of a glass wherein said antimicrobial agent is at least one element selected from the group consisting of silver; and
   aluminum present in a bulk of the glass close to the surface, wherein a concentration of the aluminum is distributed according to a profile that decreases continuously from the surface to the bulk of the glass and tends towards zero or towards a constant value identical to a concentration present in a core of the glass;
   wherein the glass of the article is formed from a sheet of flat glass.
2. The article of claim 1, wherein the profile tends towards zero or towards a constant value identical to the concentration possibly present in the core of the glass at a depth of 10 to 2500 nm from the surface.
3. The article of claim 2, wherein the depth is of from 50 to 1000 nm from the surface.
4. The article of claim 2, wherein the profile tends towards zero at a depth of 10 to 2500 nm from the surface.
5. The article of claim 2, wherein profile tends towards a constant value identical to the concentration present in the core of the glass at a depth of 10 to 2500 nm from the surface.
6. The article of claim 2, wherein the profile tends towards zero at a depth of from 50 to 1000 nm from the surface.
7. The article of claim 2, wherein the depth is of from 50 to 500 nm from the surface.
8. The article of claim 1, having an antimicrobial property and a property of a toughened glass.
9. The article of claim 1, wherein the sheet of the flat glass is a sheet of a soda-lime flat glass.
10. The article of claim 1, wherein the concentration of the aluminum is distributed according to a profile that decreases continuously from the surface to the bulk of the glass and tends towards zero.
11. The article of claim 1, wherein the concentration of the aluminum is distributed according to a profile that decreases continuously from the surface to the bulk of the glass and tends towards a constant identical to the concentration present in the core of the glass.
12. The article of claim 1, wherein the aluminum is at least one selected from the group consisting of a metal, an oxide, a nitride, and a carbide.
13. The article of claim 1, wherein the glass is a soda-lime glass, a boron glass, a lead glass, or a glass comprising an additive distributed homogeneously in the bulk.
14. The article of claim 13, wherein the glass is a glass comprising an additive distributed homogeneously in the bulk, wherein the additive is at least one selected from the group consisting of an inorganic colouring agent, an oxidizing compound, a viscosity-regulating agent and a fusion-promoting agent.
15. The article of claim 1, wherein the flat glass is a float glass, a drawn glass, or a patterned glass.
16. The article of claim 1, wherein the article can be heated to temperatures greater than 400° C. and antimicrobial properties of the glass article remain stable in comparison to antimicrobial properties of the glass article prior to heating.
17. The article of claim 1, wherein a ratio of intensities I(CsAg/I(CsSi) measured using a dynamic SIMS method is higher than 0.0002.
18. The article of claim 1, having an antimicrobial property and having been toughened at a temperature of 650 to 700° C.

* * * * *